US011958458B2

(12) United States Patent
Shiraishi et al.

(10) Patent No.: US 11,958,458 B2
(45) Date of Patent: Apr. 16, 2024

(54) VEHICLE CONTROLLER

(71) Applicant: SUBARU CORPORATION, Tokyo (JP)

(72) Inventors: Eiichi Shiraishi, Tokyo (JP); Takashi Takeda, Tokyo (JP); Shintaro Ikeda, Tokyo (JP); Satoru Akiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 359 days.

(21) Appl. No.: 17/536,327

(22) Filed: Nov. 29, 2021

(65) Prior Publication Data

US 2022/0203943 A1 Jun. 30, 2022

(30) Foreign Application Priority Data

Dec. 24, 2020 (JP) ................. 2020-214543

(51) Int. Cl.
*B60T 7/22* (2006.01)
*G07C 5/08* (2006.01)

(52) U.S. Cl.
CPC ............. *B60T 7/22* (2013.01); *G07C 5/0808* (2013.01); *B60T 2250/03* (2013.01); *B60T 2250/04* (2013.01)

(58) Field of Classification Search
CPC .... B60T 7/22; B60T 2250/03; B60T 2250/04; B60T 2201/024; B60T 2270/406; G07C 5/0808
USPC ...................................... 701/1, 93
See application file for complete search history.

(56) References Cited

U.S. PATENT DOCUMENTS

| 6,105,705 | A | 8/2000 | Faye | |
|---|---|---|---|---|
| 6,196,580 | B1 * | 3/2001 | Eberle | B60N 2/888 180/282 |
| 6,267,194 | B1 * | 7/2001 | Bullinger | B60T 8/00 180/275 |
| 6,364,433 | B1 * | 4/2002 | Stemer | B60T 7/22 303/89 |

(Continued)

FOREIGN PATENT DOCUMENTS

| JP | 09-142284 A | 6/1997 |
|---|---|---|
| JP | 11-235969 A | 8/1999 |

(Continued)

*Primary Examiner* — Jaime Figueroa
(74) *Attorney, Agent, or Firm* — Rimon P.C.

(57) ABSTRACT

A vehicle controller includes a collision detector, a braking controller, a motional state detector, and a minor collision determiner. The collision detector is configured to detect a collision between a vehicle and another object. The braking controller is configured to cause a braking device of the vehicle to generate a braking force in accordance with the detecting of the collision by the collision detector. The motional state detector is configured to detect a motional state of the vehicle. The minor collision determiner is configured to determine, based on an output from the motional state detector, that a minor collision occurs that is a collision not detected by the collision detector. The braking controller is configured to cause the braking device to generate the braking force if the collision detector does not detect the collision and the minor collision determiner determines that the minor collision occurs.

10 Claims, 4 Drawing Sheets

(56) References Cited

U.S. PATENT DOCUMENTS

| | | | | |
|---|---|---|---|---|
| 6,530,450 B2* | 3/2003 | DeLuca | B60T 13/662 | 303/191 |
| 7,006,901 B2* | 2/2006 | Wang | B62J 45/412 | 701/1 |
| 7,668,633 B2* | 2/2010 | Diebold | B60T 8/17616 | 701/45 |
| 7,866,427 B2* | 1/2011 | Zagorski | B60W 30/08 | 701/48 |
| 7,954,587 B2* | 6/2011 | Kisanuki | B60R 21/36 | 180/274 |
| 7,966,127 B2* | 6/2011 | Ono | B60R 21/0134 | 701/96 |
| 8,903,620 B2* | 12/2014 | Hammoud | B60T 7/12 | 701/70 |
| 9,205,815 B2* | 12/2015 | Hammoud | B60T 7/12 | |
| 9,604,607 B2* | 3/2017 | Hammoud | B60T 7/12 | |
| 9,731,717 B2* | 8/2017 | Kim | G01S 13/931 | |
| 10,407,060 B2* | 9/2019 | Kim | G08G 1/166 | |
| 10,481,258 B2* | 11/2019 | Matsunaga | B60W 30/09 | |
| 2002/0020575 A1* | 2/2002 | DeLuca | B60T 17/18 | 180/271 |
| 2003/0009275 A1* | 1/2003 | Koike | G01S 5/04 | 701/93 |
| 2004/0226768 A1* | 11/2004 | DeLuca | B60T 17/221 | 180/275 |
| 2006/0186702 A1* | 8/2006 | Kisanuki | B60R 21/36 | 701/45 |
| 2008/0097699 A1* | 4/2008 | Ono | B62D 15/0265 | 701/300 |
| 2010/0006363 A1* | 1/2010 | Zagorski | B60W 30/08 | 180/275 |
| 2011/0190972 A1* | 8/2011 | Timmons | G08G 1/167 | 701/31.4 |
| 2013/0253792 A1* | 9/2013 | Hammoud | B60T 7/22 | 701/70 |
| 2016/0046266 A1* | 2/2016 | Hammoud | G05D 1/0088 | 701/70 |
| 2016/0114798 A1* | 4/2016 | Kim | G08G 1/166 | 701/41 |
| 2016/0264134 A1* | 9/2016 | Ohsugi | B60T 7/22 | |
| 2016/0375899 A1* | 12/2016 | Takenaka | B60W 10/20 | 701/41 |
| 2017/0106859 A1* | 4/2017 | Kim | B60W 30/09 | |
| 2018/0056997 A1* | 3/2018 | Ohmura | B60W 10/20 | |
| 2019/0291728 A1* | 9/2019 | Shalev-Shwartz | G01S 13/865 | |
| 2020/0047727 A1* | 2/2020 | Shimada | B60T 13/745 | |
| 2020/0361369 A1* | 11/2020 | Yamaguchi | B60Q 1/5037 | |

FOREIGN PATENT DOCUMENTS

| | | |
|---|---|---|
| JP | 2000-071929 A | 3/2000 |
| JP | 2016-002870 A | 1/2016 |
| JP | 2017-074822 A | 4/2017 |

* cited by examiner

VEHICLE CONTROLLER

CROSS-REFERENCE TO RELATED APPLICATIONS

The present application claims priority from Japanese Patent Application No. 2020-214543 filed on Dec. 24, 2020, the entire contents of which are hereby incorporated by reference.

BACKGROUND

The disclosure relates to vehicle controllers that cause braking devices to automatically generate braking forces during collisions of vehicles.

When a known vehicle, such as an automobile, is involved in a collision with, for example, another vehicle, the vehicle subsequently executes post-collision braking control (including post-crash braking control and multi-collision braking control) for automatically decelerating the vehicle within the travel lane of the vehicle to prevent secondary collisions with nearby vehicles.

Japanese Unexamined Patent Application Publication (JP-A) No. H11-235969 describes a technique related to vehicle control during a collision. This technique involves actuating the full brake system if a collision is detected, so as to maintain the vehicle in a stopped state even when the vehicle is involved in a collision with another vehicle.

JP-A No. 2016-2870 describes a vehicle braking device that executes brake assistance control based on an operation performed on the brake pedal by the driver. In this vehicle braking device, if it is determinable that a collision is a minor collision from outputs from a collision sensor and an acceleration sensor, a threshold value for the amount of operation performed on the brake pedal is changed such that the brake assistance is promptly executed in an intervening manner.

JP-A No. 2017-74822 describes a braking controller that automatically actuates brakes during a collision. In this braking controller, a vehicle speed sensor and an acceleration sensor are used for determining the collision.

JP-A No. H9-142284 describes a vehicular collision alleviator that alleviates a yaw motion occurring due to a collision by utilizing a yaw motion occurring in accordance with a driving-force difference between the left and right wheels. In this vehicular collision alleviator, a yaw rate sensor and a lateral acceleration sensor are used for determining the collision.

In JP-A No. 2000-71929, a forward-rearward acceleration sensor and a lateral acceleration sensor are both used to determine whether the type of collision is a head-on collision or an irregular collision and to determine whether an airbag device is to be activated.

SUMMARY

An aspect of the disclosure provides a vehicle controller to be applied to a vehicle. The vehicle controller includes a collision detector, a braking controller, a motional state detector, and a minor collision determiner. The collision detector is configured to detect a collision between the vehicle and another object. The braking controller is configured to cause a braking device of the vehicle to generate a braking force in accordance with the detecting of the collision by the collision detector. The motional state detector is configured to detect a motional state of the vehicle. The minor collision determiner is configured to determine, based on an output from the motional state detector, that a minor collision occurs. The minor collision is a collision not detected by the collision detector. The braking controller is configured to cause the braking device to generate the braking force in a case where the collision detector does not detect the collision and the minor collision determiner determines that the minor collision occurs.

An aspect of the disclosure provides a vehicle controller to be applied to a vehicle. The vehicle controller includes a collision detector, a braking controller, an abnormality detector, a motional state detector, and a collision determiner. The collision detector is configured to detect a first collision between the vehicle and another object. The braking controller is configured to cause a braking device of the vehicle to generate a braking force in accordance with the detecting of the collision by the collision detector. The abnormality detector is configured to detect an abnormality in the collision detector. The motional state detector is configured to detect a motional state of the vehicle. The collision determiner is configured to determine a second collision based on an output from the motional state detector. The braking controller is configured to cause the braking device to generate the braking force in accordance with the determining of the second collision by the collision determiner in a case where the abnormality detector detects the abnormality in the collision detector.

An aspect of the disclosure provides a vehicle controller to be applied to a vehicle. The vehicle controller includes a collision sensor, a motional state sensor, and circuitry. The collision sensor is configured to detect a collision between the vehicle and another object. The motional state sensor is configured to detect a motional state of the vehicle. The circuitry is configured to cause a braking device of the vehicle to generate a braking force in accordance with the detecting of the collision by the collision sensor. The circuitry is configured to determine, based on an output from the motional state detector, that a minor collision occurs. The minor collision is a collision not detected by the collision detector. The circuitry is configured to cause the braking device to generate the braking force in a case where the collision detector does not detect the collision and the circuitry determines that minor collision occurs.

An aspect of the disclosure provides a vehicle controller to be applied to a vehicle. The vehicle controller includes a collision sensor, a motional state detector, and circuitry. The collision sensor is configured to detect a first collision between the vehicle and another object. The motional state sensor is configured to detect a motional state of the vehicle. The circuitry is configured to detect an abnormality in the collision sensor. The circuitry is configured to cause a braking device to generate a braking force in accordance with the detecting of the collision by the collision sensor. The circuitry is configured to determine a second collision based on an output from the motional state sensor. The circuitry is configured to cause the braking device to generate the braking force based on the determining of the second collision and the detecting of the abnormality in the collision sensor.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
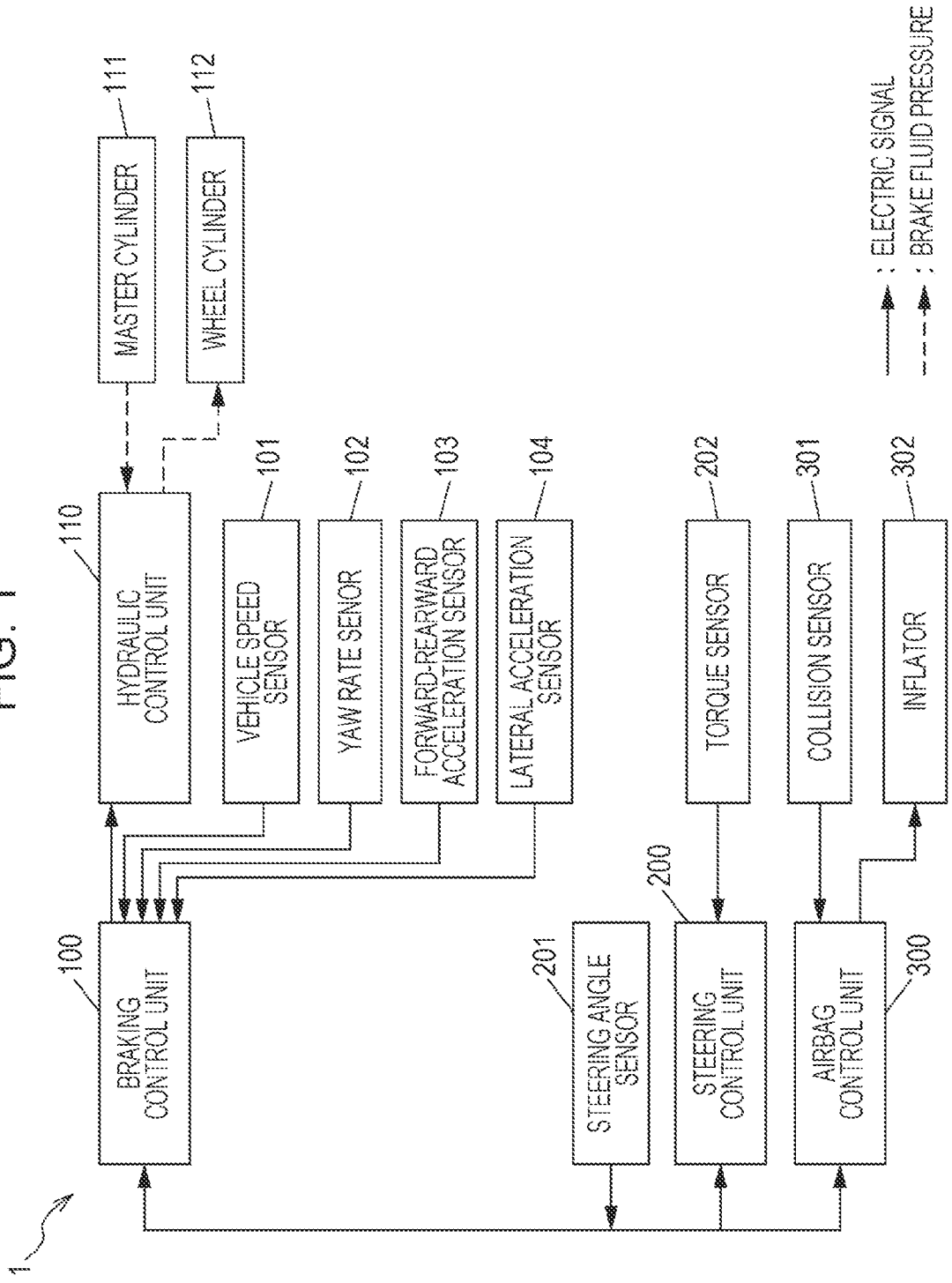
FIG. 1 is a block diagram schematically illustrating the configuration of a vehicle controller according to an embodiment of the disclosure.

In a case where post-collision braking control (including post-crash braking control and multi-collision braking control) is to be executed for decelerating and stopping a vehicle by automatic braking in accordance with collision determination in an airbag controller that gives a deployment command to airbags during a collision, for example, if the collision is relatively small (i.e., minor collision) to a degree that it is not determined as a collision by the airbag controller, there is a possibility that the post-collision braking control may be not appropriately executable in an intervening manner.

Moreover, if the airbag controller or any of sensors used for the collision determination in the airbag controller malfunctions, there is a possibility that the post-collision braking control is not executable.

It is desirable to provide a vehicle controller capable of appropriately executing post-collision braking control regardless of the state of a collision detector.

A vehicle controller according to an embodiment of the disclosure will be described below. In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The vehicle controller according to the embodiment is equipped in an automobile, such as a car.

The vehicle controller according to the embodiment has a function of executing post-collision braking control (including multi-collision braking control and post-crash braking control) for decelerating or stopping the vehicle by automatic braking when the vehicle collides with an object, such as another vehicle.

FIG. 1 is a block diagram schematically illustrating the configuration of the vehicle controller according to the embodiment.

A vehicle controller 1 has, for example, a braking control unit 100, a hydraulic control unit 110, a steering angle sensor 201, a steering control unit 200, and an airbag control unit 300.

Each unit may be a microcomputer having, for example, an information processor, such as a central processing unit (CPU), storage units, such as a random access memory (RAM) and a read-only memory (ROM), an input/output interface, and a bus that couples these components to one another.

Each unit and the steering angle sensor 201 are capable of transmitting various kinds of information via a vehicular local area network (LAN), such as a controller-area-network (CAN) communication system, or by directly communicating with each other.

The braking control unit 100 controls hydraulic service brakes (i.e., braking device) (not illustrated) provided for the individual wheels of the vehicle. In one embodiment, the braking control unit 100 may serve as a "braking controller".

The braking control unit 100 is capable of individually controlling the brake fluid pressures on wheel cylinders 112 of the respective wheels and causing the service brakes of the wheels to generate braking forces by giving a command to the hydraulic control unit 110.

The braking control unit 100 is coupled to physical sensors (i.e., motional state detectors) that detect the motional states of the vehicle and that include a vehicle speed sensor 101, a yaw rate sensor 102, a forward-rearward acceleration sensor 103, and a lateral acceleration sensor 104.

The vehicle speed sensor 101 is configured to detect the rotational speed (i.e., wheel speed) of each wheel. Based on an output from the vehicle speed sensor 101, the travel speed of the vehicle can be calculated.

The yaw rate sensor 102 is configured to detect a yaw rate serving as the rotational speed (i.e., rotational velocity) around the vertical axis of the vehicle body.

The forward-rearward acceleration sensor 103 is configured to detect acceleration acting on the vehicle body in the front-rear direction.

The lateral acceleration sensor 104 is configured to detect acceleration acting on the vehicle body in the lateral direction (i.e., vehicle-width direction).

An output from each sensor is used in various kinds of vehicle motion control to be described below, including antilock braking control, orientation stabilization control, and turn suppression control.

Antilock braking control involves, for example, reducing the brake fluid pressures on the wheels when wheel locking occurs during braking, so as to recover the rotation of the wheels.

Orientation stabilization control involves generating a braking-force difference between the left and right wheels when either of an oversteer behavior and an understeer behavior occurs in the vehicle, so as to generate a yaw moment in a direction for suppressing the behavior.

The braking control unit 100 calculates a target yaw rate, serving as a yaw rate that may occur in the vehicle body during normal traveling, based on, for example, the steering angle detected by the steering angle sensor 201, the vehicle speed detected by the vehicle speed sensor 101, and the lateral acceleration detected by the lateral acceleration sensor 104.

In accordance with a deviation between the actual yaw rate (i.e., real yaw rate) detected by the yaw rate sensor 102 and the target yaw rate, the braking control unit 100 sets the direction and the magnitude of the yaw moment to be generated in the braking control.

If the absolute value of the real yaw rate is smaller than the absolute value of the target yaw rate, it is assumed that an understeer behavior has occurred, and a yaw moment acting in the same direction as the yaw rate is thus generated toward the steering angle direction (i.e., in the steering direction) of the steering device.

In contrast, if the absolute value of the real yaw rate is larger than the absolute value of the target yaw rate, it is assumed that an oversteer behavior has occurred, and a yaw moment acting in the opposite direction from the yaw rate is thus generated in the steering direction of the steering device.

Accordingly, the vehicle is controlled such that a stable turning orientation according to the direction and amount (i.e., steering wheel angle) of steering by the driver is maintained.

The braking control unit 100 has a function of executing post-collision braking control (including post-crash braking control and multi-collision braking control) for automatically generating a braking force when a collision involving a predetermined impact (such as acceleration) or more occurs on the vehicle, so as to decelerate and stop the vehicle.

The braking control unit 100 also has a function of executing turn suppression control for generating a braking-force difference between the left and right wheels when a behavior in the yaw direction occurs in the vehicle body due to a collision, so as to suppress the behavior in the yaw direction.

Moreover, the braking control unit 100 has a function of performing auxiliary collision determination for determining a collision independently of the airbag control unit 300 by using the outputs from the vehicle speed sensor 101, the yaw rate sensor 102, the forward-rearward acceleration sensor 103, and the lateral acceleration sensor 104.

In one embodiment, the braking control unit 100 may serve as a "collision determiner" and a "minor collision determiner".

The hydraulic control unit 110 is a hydraulic pressure controller that individually adjusts the brake fluid pressures of the wheel cylinders 112 of the respective wheels.

The hydraulic control unit 110 includes, for example, an electric pump for pressurizing the brake fluid, as well as a pressure increasing valve, a pressure reducing valve, and a pressure maintaining valve for controlling the brake fluid pressures of the wheel cylinders 112.

The hydraulic control unit 110 is coupled to, for example, a master cylinder 111 and the wheel cylinders 112 by using brake fluid pipes.

The master cylinder 111 pressurizes the brake fluid in accordance with an operation performed by the driver on the brake pedal (not illustrated) for a braking operation.

The brake fluid pressure generated by the master cylinder 111 is transmitted to each wheel cylinder 112 via the hydraulic control unit 110.

The hydraulic control unit 110 has a function of increasing and reducing the brake fluid pressure generated by the master cylinder 111, where appropriate, so as to increase and reduce the brake fluid pressures of the respective wheel cylinders 112.

The wheel cylinders 112 are provided for the individual wheels and are each configured to generate a frictional force (i.e., braking force) according to the brake fluid pressure by, for example, pressing a brake pad against a disk rotor.

The steering control unit 200 is configured to control the steering device used for steering the front wheels serving as steering control wheels of the vehicle.

Figure 2:
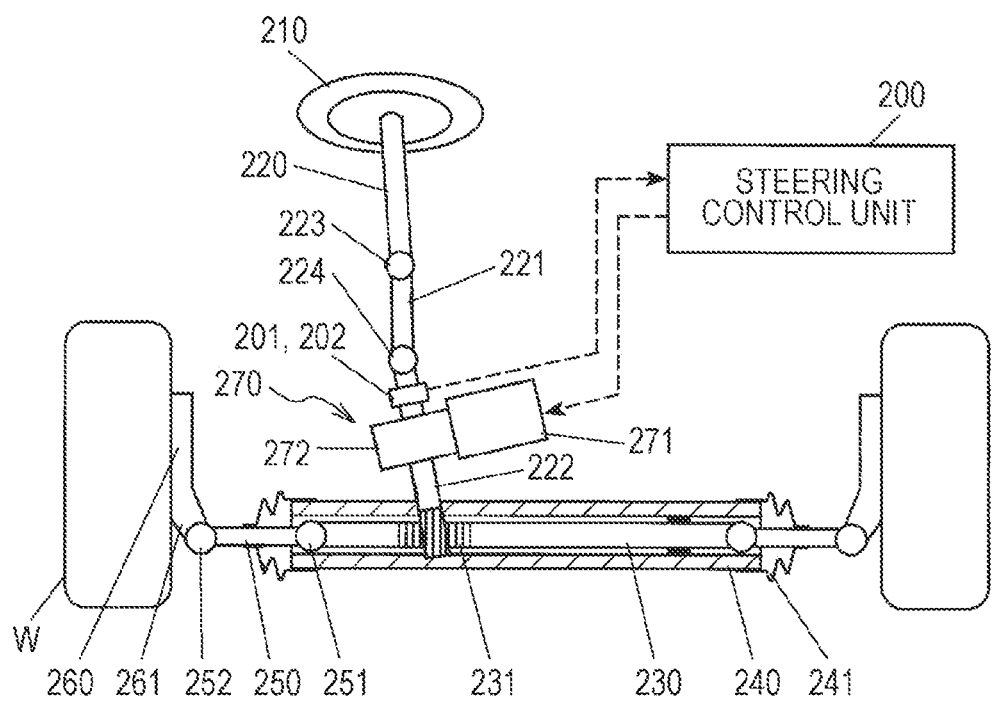
FIG. 2 schematically illustrates the configuration of a steering device of a vehicle according to the embodiment.
Figure 3:
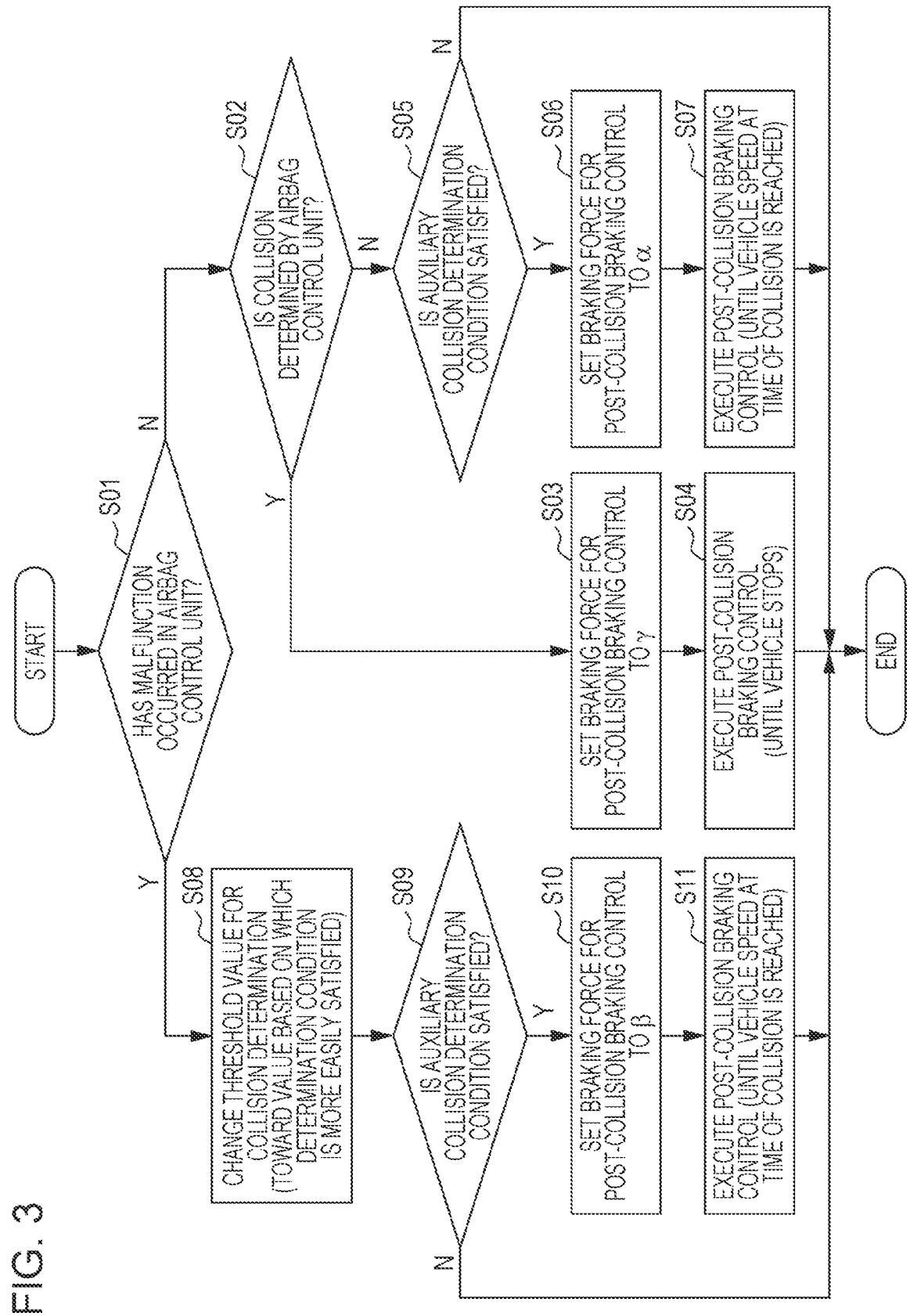
FIG. 3 is a flowchart illustrating the operation of the vehicle controller according to the embodiment.

FIG. 2 schematically illustrates the configuration of the steering device of the vehicle according to the embodiment.

The steering device includes, for example, a pinion-assisted electric power steering (EPS) device as a power assist mechanism.

The steering device has, for example, a steering wheel 210, a steering shaft 220, an intermediate shaft 221, a pinion shaft 222, a rack shaft 230, a rack housing 240, tie rods 250, housings 260, and an actuator unit 270.

The steering wheel 210 is a ring-shaped operational member to be rotated by the driver for inputting a steering operation.

The steering wheel 210 is disposed facing the driver seat inside the vehicle cabin.

The steering shaft 220 is a rotating shaft whose one end is attached to the steering wheel 210 and that transmits a rotational motion of the steering wheel 210 to a rack-and-pinion mechanism that converts the rotational motion into a translational motion in the vehicle-width direction.

The end of the steering shaft 220 opposite from the steering wheel 210 is sequentially coupled to the intermediate shaft 221 and the pinion shaft 222.

Universal joints (i.e., Cardan joints) 223 and 224 capable of transmitting rotation in state where the shafts are bent are provided between the steering shaft 220 and the intermediate shaft 221 as well as between the intermediate shaft 221 and the pinion shaft 222, respectively.

The distal end of the pinion shaft 222 is provided with a pinion gear that meshes with a rack gear 231 of the rack shaft 230 to drive the rack shaft 230.

The rack shaft 230 is a columnar member whose longitudinal direction (i.e., axial direction) is disposed parallel to the vehicle-width direction.

The rack shaft 230 is supported in a translationally movable manner in the vehicle-width direction relative to the vehicle body.

The rack shaft 230 is partially provided with the rack gear 231 that meshes with the pinion gear of the pinion shaft 222.

When the rack gear 231 is driven by the pinion gear in accordance with the rotation of the steering shaft 220, the rack shaft 230 moves translationally (i.e., rectilinearly) in the vehicle-width direction.

The rack housing 240 is a substantially cylindrical member that accommodates the rack shaft 230 while supporting the rack shaft 230 in a relatively shiftable manner in the vehicle-width direction.

The opposite ends of the rack housing 240 are provided with rack boots 241.

The rack boots 241 allow the tie rods 250 to shift relatively to the rack housing 240 while preventing foreign matter, such as dust, from entering the rack housing 240.

Each of the rack boots 241 is a flexible bellows tubular member composed of a resinous material, such as an elastomer.

Each tie rod 250 is a shaft-like interlocking member that couples an end of the rack shaft 230 to a knuckle arm 261 of the corresponding housing 260 and that rotates the housing 260 around a kingpin axis together with a translational motion of the rack shaft 230.

The inner end of the tie rod 250 in the vehicle-width direction is coupled to the end of the rack shaft 230 in a pivotable manner by using a ball joint 251.

The outer end of the tie rod 250 in the vehicle-width direction is coupled to the knuckle arm 261 of the housing 260 by using a ball joint 252.

The connection area between the tie rod 250 and the ball joint 252 is provided with a turn buckle mechanism for toe-in adjustment.

Each housing (i.e., knuckle or upright) 260 accommodates a hub bearing that supports a corresponding wheel W in a rotatable manner around the axle.

The housing 260 has the knuckle arm 261 protruding forward or rearward relative to the axle.

The housing 260 is supported in a rotatable manner around a kingpin axis serving as a predetermined rotation center.

For example, if the vehicle has a MacPherson strut front suspension system, the kingpin axis is an imaginary shaft that couples the center of the bearing of the top strut mount and the center of the ball joint coupling the lower section of the housing 260 and the transverse link (i.e., lower arm).

The housing 260 is rotated around the kingpin axis by being pushed and pulled in the vehicle-width direction by the rack shaft 230 via the tie rod 250, whereby the wheel W is steered.

The actuator unit 270 is a driving device that rotationally drives the pinion shaft 222 to provide power assistance during hands-on driving and to perform steering operation during automated driving.

The actuator unit 270 has, for example, a motor 271 and a gearbox 272.

The motor 271 is an electric actuator that generates a driving force to be applied to the steering shaft 220.

The rotational direction and the output torque of the motor 271 are controlled by the steering control unit 200.

The gearbox 272 includes a reduction gear train that reduces the rotation output (i.e., amplifies the torque) from the motor 271 and transmits the rotation output to the pinion shaft 222.

The steering control unit 200 is coupled to, for example, the steering angle sensor 201 and a torque sensor 202 directly or via, for example, the vehicular LAN.

For example, the steering angle sensor 201 and the torque sensor 202 are integrated and are provided in a region of the pinion shaft 222 on the steering wheel 210 side from the actuator unit 270.

The steering angle sensor 201 has an angle encoder that detects a rotational angle position of either one of the pinion shaft 222 and the steering wheel 210.

The torque sensor 202 detects a torque (e.g., an input torque from the steering wheel 210) acting on the pinion shaft 222.

The airbag control unit 300 is provided inside the vehicle cabin and is configured to control the deployment of each airbag serving as a vehicle-occupant restraining device that restrains a vehicle occupant during a collision.

Each airbag has a shape of a bag formed by using a nylon base fabric and is normally accommodated in a folded state within an interior member. During a collision, the airbag deploys by receiving deployment gas, so as to restrain, for example, the vehicle occupant.

The airbag control unit 300 is coupled to, for example, a collision sensor 301 and an inflator 302.

The collision sensor 301 includes a plurality of collision sensors that are provided at various locations of the vehicle body and that are configured to detect significantly large acceleration acting on the vehicle body during a collision.

Each collision sensor 301 functions as a collision detector by operating in cooperation with the airbag control unit 300.

The airbag control unit 300 determines whether a collision that may involve deployment of each airbag has occurred based on an output from the collision sensor 301.

The inflator 302 is a gas generator that supplies deployment gas to each airbag provided in the vehicle in response to a command from the airbag control unit 300.

The airbag control unit 300 has a known on-board diagnostic (OBD) function for detecting an abnormality, such as a malfunction, in the airbag control unit 300 and the collision sensors 301.

The vehicle controller 1 according to the embodiment has a function of executing post-collision braking control for automatically actuating the braking device to decelerate the vehicle when a collision determination condition is satisfied in the airbag control unit 300.

Furthermore, the vehicle controller 1 has a function of executing the post-collision braking control in an intervening manner by performing collision determination based on an output from a physical sensor that detects a motional state of the vehicle even when a minor collision in which the collision determination condition is not satisfied in the airbag control unit 300 has occurred or when an abnormality, such as a malfunction, has occurred in, for example, the airbag control unit 300 or the collision sensors 301.

This will be described in detail below.

FIG. 2 is a flowchart illustrating the operation of the vehicle controller 1 according to the embodiment.

The steps will be described below in a predetermined sequence.

In step S01, the airbag control unit 300 uses the self-diagnostic function to determine whether a malfunction has occurred in the airbag control unit 300 and the collision sensors 301.

If a malfunction has not occurred (i.e., if the airbag control unit 300 and the collision sensors 301 are operating normally), the process proceeds to step S02. If a malfunction has occurred, the process proceeds to step S08.

In step S02, the airbag control unit 300 determines whether a collision that may involve deployment of the airbags has occurred based on an output from any one of the collision sensors 301.

For example, if the acceleration detected by the collision sensor 301 is larger than or equal to a predetermined threshold value, the inflator 302 is given an actuation command to deploy the airbags, and the process proceeds to step S03. Otherwise, the process proceeds to step S05.

In step S03, the braking control unit 100 determines to execute post-collision braking control, and sets a target braking force of the braking device corresponding to when the control is to be executed in an intervening manner to $\gamma$ serving as a predetermined value.

Subsequently, the process proceeds to step S04.

In step S04, the braking control unit 100 gives a command to the hydraulic control unit 110 to apply brake fluid pressures to the wheel cylinders 112, thereby causing the braking device to generate a braking force and thus decelerating the vehicle.

The target braking force in this case is $\gamma$ set in step S03.

The post-collision braking control is executed until the vehicle stops, and the sequential process subsequently ends (i.e., returns to the beginning).

In step S05, the braking control unit 100 executes auxiliary collision determination for determining whether a collision that may involve execution of post-collision braking control has occurred based on outputs from sensors, namely, the vehicle speed sensor 101, the yaw rate sensor 102, the forward-rearward acceleration sensor 103, and the lateral acceleration sensor 104, other than the collision sensors 301 for controlling the airbags.

In the auxiliary collision determination, for example, it is possible to determine the type of collision, such as a frontal collision, a rear collision (i.e., rear-end collision), a side collision, or an oblique collision. This will be described in detail later.

In the auxiliary collision determination, for example, a threshold value is preliminarily set for the acceleration in the front-rear direction and the acceleration in the lateral direction of the vehicle, and it can be determined that a collision has occurred if either one of the acceleration values (or deceleration values) exceeds the threshold value.

Since this threshold value is used for detecting a so-called minor collision in which an input from another vehicle is relatively small, the threshold value is set such that an absolute value thereof is small relative to the acceleration corresponding to the threshold value used for the collision determination in the airbag control unit 300.

When the auxiliary collision determination condition is satisfied and it is determined that the vehicle is involved in a minor collision, the process proceeds to step S06. Otherwise, the sequential process ends (i.e., returns to the beginning).

In step S06, the braking control unit 100 determines to execute post-collision braking control, and sets a target braking force of the braking device corresponding to when the control is to be executed in an intervening manner to α serving as a predetermined value.

In view of the fact that the collision is a minor collision, the target braking force α is set to be smaller than the target braking force γ set in step S03.

Subsequently, the process proceeds to step S07.

In step S07, the braking control unit 100 gives a command to the hydraulic control unit 110 to apply brake fluid pressures to the wheel cylinders 112, thereby causing the braking device to generate a braking force and thus decelerating the vehicle.

The target braking force in this case is α set in step S06.

In this case, if a behavior in the yaw direction (i.e., the rotating direction of the vehicle around the vertical axis) has occurred in the vehicle body due to the collision, the braking control unit 100 executes turn suppression control for generating a braking-force difference between the left and right wheels to suppress the behavior in the yaw direction.

The post-collision braking control and the turn suppression control are executed until the vehicle decelerates to the vehicle speed immediately prior to the collision, and the sequential process subsequently ends (i.e., returns to the beginning).

If the vehicle is in a stopped state at the time of the collision, the post-collision braking control is executed until the vehicle stops.

In step S08, the braking control unit 100 changes the threshold value, for vehicle-body acceleration and the like, used for determining whether a collision has occurred (i.e., whether the collision determination condition is satisfied) in the auxiliary collision determination toward a value based on which the collision determination condition is more easily satisfied (e.g., toward a smaller absolute acceleration value), relative to the threshold value used for determining whether the collision determination condition is satisfied in the steering control unit 200.

Subsequently, the process proceeds to step S09.

In step S09, the braking control unit 100 uses the threshold value set (i.e., changed) in step S08 to perform auxiliary collision determination similarly to step S05.

When the auxiliary collision determination condition is satisfied and it is determined that the vehicle is involved in a collision, the process proceeds to step S10. Otherwise, the sequential process ends (i.e., returns to the beginning).

In step S10, the braking control unit 100 determines to execute post-collision braking control, and sets a target braking force of the braking device corresponding to when the control is to be executed in an intervening manner to β serving as a predetermined value.

The target braking force β is set to be smaller than the target braking force γ set in step S03 and larger than the target braking force α set in step S06.

Subsequently, the process proceeds to step S11.

In step S11, the braking control unit 100 gives a command to the hydraulic control unit 110 to apply brake fluid pressures to the wheel cylinders 112, thereby causing the braking device to generate a braking force and thus decelerating the vehicle.

The target braking force in this case is β set in step S10.

In this case, if a behavior in the yaw direction has occurred in the vehicle body due to the collision, the braking control unit 100 executes turn suppression control similarly to step S07.

The post-collision braking control and the turn suppression control are executed until the vehicle decelerates to the vehicle speed immediately prior to the collision, and the sequential process subsequently ends (i.e., returns to the beginning).

The following description relates to how the type of collision is determined in the auxiliary collision determination process.

FIG. 4A to FIG. 4D schematically illustrate examples of types of vehicle-to-vehicle collisions.

Figure 4A:
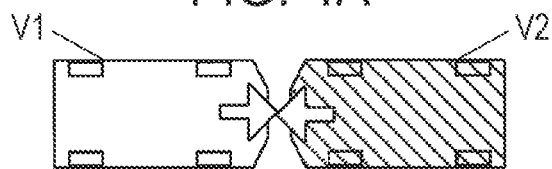
FIG. 4A to FIG. 4D schematically illustrate examples of types of vehicle-to-vehicle collisions.

FIG. 4A illustrates a state where a head-on collision has occurred between a vehicle V1 and another vehicle V2.

In such a head-on collision, for example, the forward-rearward acceleration sensor 103 detects significantly large deceleration. Moreover, the vehicle speed detected by the vehicle speed sensor 101 also decreases rapidly.

On the other hand, the yaw rate and the lateral acceleration indicate substantially no change or a minor change.

This trend can also be seen in a case where the vehicle V1 collides with the rear end of the vehicle V2. In this case, the rates of decrease in the detected forward-rearward acceleration and vehicle speed are relatively lower than in a head-on collision.

Figure 4B:

FIG. 4B illustrates a rear collision (i.e., rear-end collision) in which the vehicle V2 has collided with the rear end of the vehicle V1.

In such a rear-end collision, for example, the forward-rearward acceleration sensor 103 detects significantly large acceleration. The vehicle speed also increases rapidly.

On the other hand, the yaw rate and the lateral acceleration indicate substantially no change or a minor change.

Figure 4C:
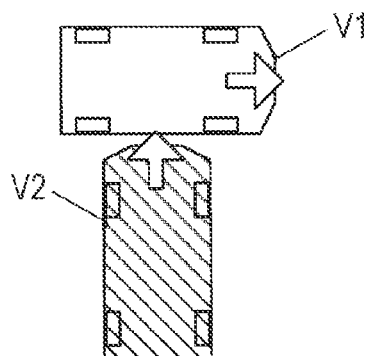

FIG. 4C illustrates a side collision in which the vehicle V2 traveling orthogonally to the front-rear direction of the vehicle V1 has collided with the right side surface of the vehicle V1.

In such a side collision, the lateral acceleration sensor 104 detects significantly large acceleration. If the location of the collision is shifted in the front-rear direction of the vehicle V1 relative to the center of gravity thereof, the yaw rate sensor 102 detects a significant increase in the yaw rate caused by the collision.

On the other hand, the forward-rearward acceleration and the vehicle speed change relatively small as compared with the changes in the lateral acceleration and the yaw rate.

Figure 4D:
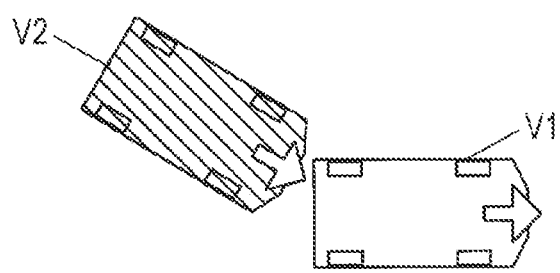

FIG. 4D illustrates a rear collision in which the vehicle V2 has obliquely collided with (i.e., rear-ended) the rear end of the vehicle V1 at an angle from the left rear side.

In this case, lateral acceleration and a yaw rate also occur in addition to changes in the forward-rearward acceleration and the vehicle speed similar to the rear-end collision illustrated in FIG. 4B.

However, the relationship between the lateral acceleration and the yaw rate tends to have relatively higher lateral acceleration, as compared with, for example, when the vehicle makes a normal turn.

As in these examples, in the auxiliary collision determination, the braking control unit 100 is capable of determining whether a collision has occurred in addition to determining the type of collision by combining a plurality of physical sensors, such as the vehicle speed sensor 101, the yaw rate sensor 102, the forward-rearward acceleration sensor 103, and the lateral acceleration sensor 104, configured to detect the motional states of the vehicle.

If the type of collision involves an occurrence of a yaw rate due to the collision, turn suppression control is executed in addition to post-collision braking control, so that the vehicle can be decelerated in a more stable state.

As described above, the embodiment can achieve the following effects.

1. Even in a case of a minor collision not determined as a collision that involves deployment of the airbags in the airbag control unit 300, auxiliary collision determination and collision-type determination are performed based on outputs from the vehicle speed sensor 101, the yaw rate sensor 102, the forward-rearward acceleration sensor 103, and the lateral acceleration sensor 104 that detect the motional states used in, for example, vehicle behavior control, so that the minor collision can be appropriately determined and post-collision braking control can be executed.
2. When the auxiliary collision determination condition is satisfied due to a minor collision, the target braking force α that is smaller than the target braking force γ corresponding to when the airbag control unit 300 determines a collision is set, so that an appropriate braking force is applied for the minor collision, thereby appropriately achieving improved safety without giving a sense of discomfort or a sense of fear to the vehicle occupant.
3. When the airbag control unit 300 or the like malfunctions, auxiliary collision determination is performed based on outputs from the vehicle speed sensor 101, the yaw rate sensor 102, the forward-rearward acceleration sensor 103, and the lateral acceleration sensor 104 that detect the motional states used in, for example, vehicle behavior control, so that a collision can be appropriately determined and post-collision braking control can be executed, thereby achieving a fail-safe feature of the vehicle.
4. The target braking force β for post-collision braking control corresponding to when the auxiliary collision determination condition is satisfied is set to be smaller than the target braking force γ corresponding to when the airbag control unit 300 determines a collision. Thus, even in a case where the collision is not severe enough to be determined as a collision by the airbag control unit 300 as a result of changing the threshold value used for collision determination, an appropriate braking force is applied, thereby appropriately executing post-collision braking control without giving a sense of discomfort or a sense of fear to the vehicle occupant.
5. The vehicle speed sensor 101, the yaw rate sensor 102, the forward-rearward acceleration sensor 103, and the lateral acceleration sensor 104 are used for the auxiliary collision determination, so that the auxiliary collision determination can be appropriately performed using general-purpose sensors normally equipped in common vehicles.

Modifications

The embodiment of the disclosure is not limited to that described above and permits various modifications and alterations that are included in the technical scope of the embodiment of the disclosure.

1. The configuration of the vehicle controller 1 and the configuration of the vehicle are not limited to those in the above embodiment and may be modified, as appropriate.

For example, the allocation of the functions to the individual units is an example and may be changed, as appropriate. For example, although the auxiliary collision determination is performed by the braking control unit 100 in the embodiment, the auxiliary collision determination may alternatively be performed by using another unit independent therefrom.

Moreover, the technique for determining the type of collision is not limited to that in the embodiment and may be changed, as appropriate.

2. In the embodiment, a braking force is generated in post-collision braking control by using a hydraulic service brake. Alternatively, for example, a braking force may be generated by using, for example, either one of a regenerative brake using a motor generator and an electric brake, such as an electric parking brake, capable of performing dynamic braking.

Furthermore, these plurality of kinds of brakes may be cooperatively controlled.

3. The kinds of sensors used in the auxiliary collision determination in the embodiment are examples, and may include an additional sensor in addition thereto or may exclude one or more sensors therefrom.
4. In the embodiment, the post-collision braking control corresponding to the auxiliary collision determination involves decelerating the vehicle to the vehicle speed immediately prior to the collision. Alternatively, the post-collision braking control may be executed until another state is reached. For example, the vehicle may be stopped or may be decelerated to a predetermined vehicle speed lower than the vehicle speed immediately prior to the collision.
5. In the embodiment, the target braking forces α and β in the post-collision braking control corresponding to when the auxiliary collision determination condition is satisfied are fixed values. Alternatively, for example, the target braking forces may be varied in accordance with the determined type of collision (e.g., any one of frontal, rear, side, or oblique collisions) and the degree thereof (i.e., the magnitude of input).

According to the embodiment of the disclosure, even a minor collision not determined as a collision by a collision detector may still be determined as a collision by using sensors that detect the motional states of the vehicle, so that post-collision braking control can be executed.

Examples of the collision detector used include an airbag control unit that determines whether an airbag device serving as a vehicle-occupant restraining device is to be deployed and a collision sensor (i.e., impact sensor) used for controlling the airbag control unit (i.e., for determining whether an airbag is to be deployed).

Furthermore, by generating an appropriate braking force for a minor collision, post-collision braking control can be appropriately executed without giving a sense of discomfort or a sense of fear to the vehicle occupant.

Furthermore, even when an abnormality, such as a malfunction, occurs in the collision detector, a collision can still be determined using motional state sensors normally provided in common vehicles, and post-collision braking control can be executed in an intervening manner, thereby achieving a fail-safe feature of the vehicle.

Moreover, even in a case where a collision is not severe enough to be determined as a collision by the collision detector, an appropriate braking force is applied, thereby appropriately achieving improved safety without giving a sense of discomfort or a sense of fear to the vehicle occupant.

The above-described effects can be achieved by using sensors normally equipped in common vehicles.

Accordingly, the embodiment of the disclosure can provide a vehicle controller capable of appropriately executing post-collision braking control regardless of the state of a collision detector.

The vehicle controller 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle controller 1 including the braking control unit 100, the hydraulic control unit 110, the steering angle sensor 201, the steering control unit 200, and the airbag control unit 300. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle controller to be applied to a vehicle, the vehicle controller comprising:
 a collision detector configured to detect a collision between the vehicle and another object;
 a braking controller configured to cause a braking device of the vehicle to generate a braking force in accordance with the detecting of the collision by the collision detector;
 a motional state detector configured to detect a motional state of the vehicle; and
 a minor collision determiner configured to determine, based on an output from the motional state detector, that a minor collision occurs, the minor collision not being detected by the collision detector,
 wherein the braking controller is configured to cause the braking device to generate the braking force in a case where the collision detector dose not detects the collision and the minor collision determiner determines that the minor collision occurs.

2. The vehicle controller according to claim 1,
 wherein the braking controller is configured to reduce the braking force to be generated in accordance with the determining of the minor collision by the minor collision determiner, relative to the braking force to be generated in accordance with the detecting of the collision by the collision detector.

3. A vehicle controller to be applied to a vehicle, the vehicle controller comprising:
 a collision detector configured to detect a first collision between the vehicle and another object;
 a braking controller configured to cause a braking device of the vehicle to generate a braking force in accordance with the detecting of the collision by the collision detector;
 an abnormality detector configured to detect an abnormality in the collision detector;
 a motional state detector configured to detect a motional state of the vehicle; and
 a collision determiner configured to determine a second collision based on an output from the motional state detector,
 wherein the braking controller is configured to cause the braking device to generate the braking force in accordance with the determining of the second collision by the collision determiner in a case where the abnormality detector detects the abnormality in the collision detector.

4. The vehicle controller according to claim 3,
 wherein the braking controller is configured to reduce the braking force to be generated in accordance with the determining of the second collision by the collision determiner, relative to the braking force to be generated in accordance with the detecting of the first collision by the collision detector.

5. The vehicle controller according to claim 1,
 wherein the motional state detector comprises at least one of a vehicle speed sensor configured to detect a travel speed of the vehicle, an acceleration sensor configured to detect acceleration of a vehicle body, or a yaw rate sensor configured to detect a yaw rate of the vehicle body.

6. The vehicle controller according to claim 2,
 wherein the motional state detector comprises at least one of a vehicle speed sensor configured to detect a travel speed of the vehicle, an acceleration sensor configured to detect acceleration of a vehicle body, or a yaw rate sensor configured to detect a yaw rate of the vehicle body.

7. The vehicle controller according to claim 3,
 wherein the motional state detector comprises at least one of a vehicle speed sensor configured to detect a travel speed of the vehicle, an acceleration sensor configured to detect acceleration of a vehicle body, or a yaw rate sensor configured to detect a yaw rate of the vehicle body.

8. The vehicle controller according to claim 4,
 wherein the motional state detector comprises at least one of a vehicle speed sensor configured to detect a travel speed of the vehicle, an acceleration sensor configured to detect acceleration of a vehicle body, or a yaw rate sensor configured to detect a yaw rate of the vehicle body.

9. A vehicle controller to be applied to a vehicle, the vehicle controller comprising:
  a collision sensor configured to detect a collision between the vehicle and another object;
  a motional state sensor configured to detect a motional state of the vehicle; and
  circuitry configured to
    cause a braking device of the vehicle to generate a braking force in accordance with the detecting of the collision by the collision sensor, and
    determine, based on an output from the motional state sensor, that a minor collision occurs, the minor collision not being detected by the collision sensor,
  wherein the circuitry is configured to cause the braking device to generate the braking force in a case where the collision sensor dose not detects the collision and the circuitry determines that the minor collision occurs.

10. A vehicle controller to be applied to a vehicle, the vehicle controller comprising:
  a collision sensor configured to detect a first collision between the vehicle and another object;
  a motional state sensor configured to detect a motional state of the vehicle; and
  circuitry configured to
    detect an abnormality in the collision sensor;
    cause a braking device of the vehicle to generate a braking force in accordance with the detecting of the collision by the collision sensor, and
    determine a second collision based on an output from the motional state sensor,
  wherein the circuitry is configured to cause the braking device to generate the braking force based on the determining of the second collision and the detecting of the abnormality in the collision sensor.

* * * * *